United States Patent
Sundholm

(10) Patent No.: US 9,090,399 B2
(45) Date of Patent: Jul. 28, 2015

(54) METHOD AND MEANS IN WASTE HANDLING

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 13/259,066

(22) PCT Filed: Mar. 16, 2010

(86) PCT No.: PCT/FI2010/050202
§ 371 (c)(1),
(2), (4) Date: Sep. 22, 2011

(87) PCT Pub. No.: WO2010/112669
PCT Pub. Date: Oct. 7, 2010

(65) Prior Publication Data
US 2012/0234924 A1    Sep. 20, 2012

(30) Foreign Application Priority Data

Apr. 3, 2009 (FI) .................................. 20095369
May 19, 2009 (FI) .................................. 20095554

(51) Int. Cl.
| | |
|---|---|
| G06F 17/00 | (2006.01) |
| G06K 7/08 | (2006.01) |
| G06K 19/06 | (2006.01) |
| B65F 1/14 | (2006.01) |
| B07C 5/34 | (2006.01) |

(52) U.S. Cl.
CPC ............ B65F 1/1484 (2013.01); B07C 5/3412 (2013.01); *B65F 2210/112* (2013.01); *B65F 2210/1125* (2013.01); *B65F 2210/128* (2013.01)

(58) Field of Classification Search
USPC .......................................... 235/375, 451, 492
See application file for complete search history.

(56) References Cited

U.S. PATENT DOCUMENTS

| | | | |
|---|---|---|---|
| 4,008,851 A | 2/1977 | Hirsch | |
| 5,251,761 A | 10/1993 | Hansen et al. | |
| 5,438,708 A * | 8/1995 | Jacovitz | 2/161.6 |
| 6,116,668 A * | 9/2000 | Carpol | 294/1.3 |
| 6,147,662 A * | 11/2000 | Grabau et al. | 343/895 |
| 6,478,229 B1 | 11/2002 | Epstein | |
| 6,611,961 B2 * | 9/2003 | Demeur et al. | 2/159 |
| 6,957,777 B1 | 10/2005 | Huang | |
| 2004/0199401 A1 * | 10/2004 | Wagner et al. | 705/1 |

(Continued)

FOREIGN PATENT DOCUMENTS

| | | |
|---|---|---|
| DE | 20105939 U1 | 10/2001 |
| GB | 2 402 704 A | 12/2004 |

(Continued)

OTHER PUBLICATIONS

Finnish Search Report, dated Jan. 29, 2010 and Feb. 1, 2010, issued in corresponding Finnish Patent Application Nos. 20095554 & 20095369.

*Primary Examiner* — Tuyen K Vo
(74) *Attorney, Agent, or Firm* — Birch, Stewart, Kolasch & Birch, LLP

(57) ABSTRACT

A closing system and associated method for closing and handling waste or recyclable material which utilizes in the closing system a closing device which is provided with at least one, visible, RFID identifier and which contains an adhesive surface which is used to close and secure the waste or recyclable material within the receptacle.

16 Claims, 7 Drawing Sheets

(56) References Cited

U.S. PATENT DOCUMENTS

| | | | |
|---|---|---|---|
| 2006/0109118 A1 | 5/2006 | Pelo et al. | |
| 2006/0273180 A1* | 12/2006 | Ammond et al. | 235/492 |
| 2007/0008121 A1* | 1/2007 | Hart | 340/540 |
| 2007/0126589 A1* | 6/2007 | Jacober et al. | 340/572.8 |
| 2007/0188332 A1* | 8/2007 | Phaneuf et al. | 340/572.8 |
| 2007/0262878 A1* | 11/2007 | Maruca et al. | 340/686.1 |
| 2008/0067936 A1* | 3/2008 | Ishimoto et al. | 313/582 |
| 2008/0084274 A1 | 4/2008 | Ohashi et al. | |
| 2008/0180255 A1* | 7/2008 | Isabell | 340/572.8 |
| 2009/0045959 A1* | 2/2009 | Adstedt et al. | 340/572.3 |

FOREIGN PATENT DOCUMENTS

| | | | |
|---|---|---|---|
| GB | 2 449 710 A | 12/2008 | |
| JP | 09244533 A | 9/1997 | |
| JP | 9-278103 A | 10/1997 | |
| JP | 2001019110 A | 1/2001 | |
| JP | 2001328702 A | 11/2001 | |
| JP | 2002123805 A | 4/2002 | |
| JP | 2004175556 A | 6/2004 | |
| JP | 2005164739 A | 6/2005 | |
| JP | 3115807 A | 11/2005 | |
| JP | 2008242920 A | 10/2008 | |
| TW | 305859 U | 2/2007 | |
| WO | WO 0043271 A1 | 7/2000 | |
| WO | WO 2005/118435 A1 | 12/2005 | |
| WO | WO 2006/096101 A1 | 9/2006 | |
| WO | WO 2008/043158 A1 | 4/2008 | |

* cited by examiner

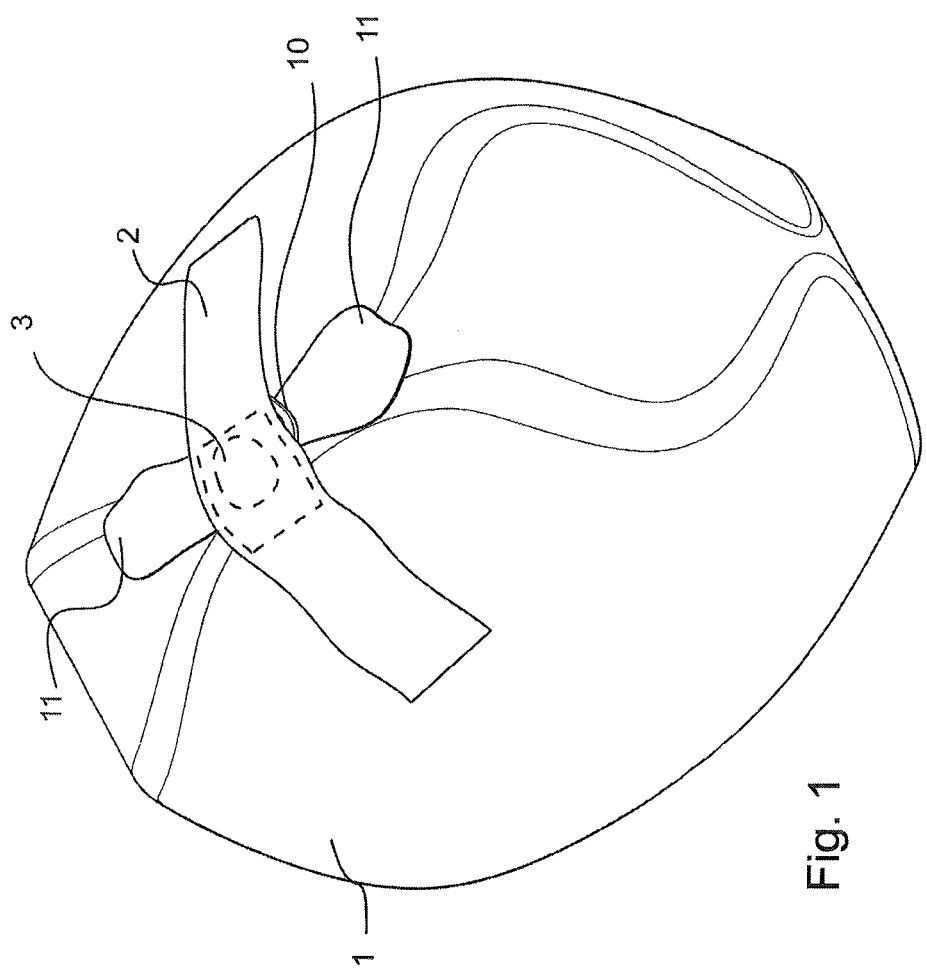

US 9,090,399 B2

METHOD AND MEANS IN WASTE HANDLING

BACKGROUND OF THE INVENTION

The object of the invention is a method as defined in the preamble of claim 1.

The object of the invention is also a closing means as defined in the preamble of claim 15.

The invention relates generally to waste handling and more particularly to waste sorting.

Nowadays it is typical, e.g. in respect of household waste, that households use as waste bags different bags, sacks or carrier bags, in which waste is placed. For example, in Finland it is normal to use plastic carrier bags from shops, in which shopping has been carried home, as waste bags. Wastes are carried in plastic carrier bags to a waste bin, into which typically the bag, and its contents, closed with a knot is placed. The wastes are transported onwards by garbage truck for further processing. Correspondingly, pneumatic waste transport systems are known in the art, in which wastes are transported in waste bags from disposal points in transfer tubing for further processing. In both methods one drawback, among others, is that the sorting of wastes is awkward. It is often possible that users do not bother to sort wastes into different allotments, but instead mix all wastes in the same waste bag and waste bin. In this case mixed waste is produced, the reclamation of which is difficult.

Known in the art are solutions for sorting waste, in which solutions different types of waste are arranged to be transported in different containers, such as in waste bags or bins of different colors. For example, households place different types of wastes in waste bags of different colors. A waste bag of a specific color is specified for each type of waste. Wastes are transported e.g. in a normal garbage truck to a waste center, where the wastes are sorted into different allotments on the basis of the colors of the waste bags. The sorting of waste optically is described in publication EP0759816. A drawback here is that there must be waste bags separately arranged for the purpose for each waste type to be sorted. Another drawback is also the uncertainty of operation of the automatic optical sorting apparatus used in sorting the waste bags in a dirty environment. The sorting of waste is described in publication WO03039773 A1.

On the one hand, nothing guarantees that a waste producer, such as a household, will use a waste bag of the correct color for each type of waste. It is difficult to get misusers of the system to change their habits. On the other hand, identifying or tracing a misuser after the event is almost impossible.

Furthermore, it is typical when using plastic carrier bags or plastic bags as waste bags that the knot made in the bag, e.g. from the carrying handles, opens, in which case the wastes can spread freely during transportation to outside the bag. This makes the transport vehicle, the waste bin and/or other waste bags dirty on the outside, hampering the sorting process and also forming a hygiene problem.

The aim of the invention is to achieve a new type of solution, by means of which the problems of prior art can be avoided.

BRIEF DESCRIPTION OF THE INVENTION

The invention is based on a concept wherein a closing means, which is provided with an RFID identifier, is used for the closing of waste bags.

The solution according to the invention has a number of important advantages. By using a closing means according to the invention, it is ensured that, on the one hand, waste bags, waste carrier bags, waste sacks or corresponding stay closed in transportation, and also the operation of the system, such as more effective sorting than earlier, can be controlled by means of an RFID identifier. Arranging an RFID identifier in a closing means enables the use of any bag, carrier bag, sack, or corresponding whatsoever in waste transport and does not require separate transport containers specially intended for certain waste allotments. According to one preferred embodiment of the invention, a reader of an RFID identifier can be in connection with a waste bin or a waste disposal point, such as a waste room. In connection with a waste transport system, only one disposal point or waste bin can in this case be conveniently used for different materials, in which case waste is sorted into different allotments in the system later according to an RFID identifier. Also supplying waste material without an RFID identifier according to the invention into a disposal point of the system can also be prevented.

An RFID identifier can be used to register the amount of waste bought by a certain user, in which case invoicing principles can be changed. On the other hand, a user can be rewarded for sorting waste, e.g. by reducing the waste transport fee of waste that is fit for recycling.

According to a typical embodiment, the closing means is a closing sticker tape, which is e.g. an RFID sticker tape of the color fitted for each waste allotment, which sticker tape also comprises e.g. a text identifier according to the type of waste. In addition, an identification number or other identifier, which is separately specified according to each household, housing company, company other waste producer that produces waste, can be formed for a closing means and/or RFID identifier. A closing means can also comprise a picture or drawing of the waste type in connection with which the closing means in question is intended to be used.

The invention can thus be utilized by using the ordinary plastic carrier bags of a shop, which are closed with a closing means according to the invention. The carrier bag is filled with waste and closed by knotting its carrying loops. A typical way is to tie at first one knot, after which a closing means, preferably a sticker tape, is placed on top of the knot, and fixed over the knot of the carrier bag. After that a second knot can be made with the carrying loops. The RFID identifier in this case remains partly protected and avoids transport damage. The closing means according to the invention also prevents the opening of the knots of the waste bag.

In the waste sorting center to which the waste bags are transported conventionally with garbage trucks or in some other way, such as with a pneumatic waste transfer system, the waste bags are sorted into different waste allotments on the basis of the information given by the RFID identifiers. After this the waste bags are ripped open and the bags are removed from the rest of the waste. The RFID identifier of the closing means according to the invention can still be used as a verification by the aid of a reader means that the waste bags have been removed from the sorted waste allotments.

A dedicated closing means comprising an RFID identifier is arranged for each waste allotment. Recyclable paper, for instance, is handled in a corresponding manner. In this case paper, such as newspapers, is placed in a bag and it is closed with a closing means according to the invention, which closing means comprises an RFID identifier.

The closing means according to the invention can be supplied as a web comprising a number of closing means, e.g. arranged into a roll. This type of closing means roll preferably comprises a cutting point between each two consecutive closing means. Cutting the closing means can be facilitated by arranging perforation or corresponding in the roll to facilitate detaching a closing means from the roll. The closing means according to the invention can be supplied as sheet comprising a number of closing means. This type of closing means sheet comprises a cutting point between each adjacent closing means. A closing means sheet preferably comprises a base part, which protects the adhesive surface of the closing means. Perforation or corresponding is preferably formed in the base part to facilitate detaching a closing means from the sheet. Typically there is a cut between closing means, which extends to the base part from the surface of the closing means, but not through the base part. In this case the closing means are easy to detach from the closing means sheet (like e.g. sticking plaster).

By using closing means according to the invention, the operation of the waste transport system, such as of a pneumatic waste transport system, can be optimized more accurately than earlier. For example, the speed and quantity of the wastes transferred in the tubing can be measured more easily by means of the RFID identifiers of the closing means of the waste bags and by means of the RFID readers arranged in the transfer system. Likewise the transfer time from the waste disposal point to the waste station can be determined, in which case emptying of the next disposal point can be optimized.

Waste disposal points can be constructed so that they do not accept waste if the waste bag is not provided with a closing means comprising an RFID identifier.

An RFID identifier can also report the filling degree of a waste bin or of a waste disposal point. In this case the transportation of waste can be optimized. Transport is performed only if the filling degree is exceeded. This saves energy and reduces emissions. An RFID identifier can also report the contents of waste. If the waste contains a lot of something decomposable, a collection can be requested for the location within a set time. An RFID identifier can also give a temperature alarm, i.e. a fire alarm. An RFID identifier can also report when waste has been put into a waste bin and into which waste bin, in which case in which case information about waste quantities, types and trends is obtained.

Using a closing means according to the invention in pneumatic pipe transport has the advantage that a dedicated disposal point for different allotments is not needed, but instead all waste goes to the same disposal point. In normal waste transport waste containers of only a single type are needed, and only one garbage truck collects them instead of 3-4 trucks. It is also advantageous if all wastes, such as mixed waste, biowaste, glass waste, metal waste and paper waste, are placed into a bag. In this case the allotments and the tubing stay clean and their tube transportation is easier. The bag is automatically removed in a sorting center.

The invention can be applied according to one preferred embodiment so that dedicated closing means, which comprise RFID identifiers, are supplied to each household or other waste-producing community or corresponding. This assists sorting. In addition, by means of the combination of a closing means and RFID identifier according to the invention, it is easy to demonstrate where the costs of the waste handling system are generated. Fees can be allocated to waste producers more accurately than earlier.

According to one preferred embodiment, households have a fixed waste charge and receive a credit for each waste bag sorted in a sorting center. Based on the automatic reading of RFID identifiers, the system can allocate the sorted waste by means of an information system so that the credit goes to the correct target.

Sorting in a sorting center on the basis of an RFID identifier is very easy, as also is identification of a household. Arranging an RFID identifier in a closing means thus gives numerous opportunities in waste sorting.

BRIEF DESCRIPTION OF THE FIGURES

In the following, the invention will be described in detail by the aid of some embodiments with reference to the attached drawings, wherein:

FIG. 1 presents one embodiment of a closing means according to the invention, in connection with a waste bag.

DETAILED DESCRIPTION OF THE INVENTION

Figure 3:
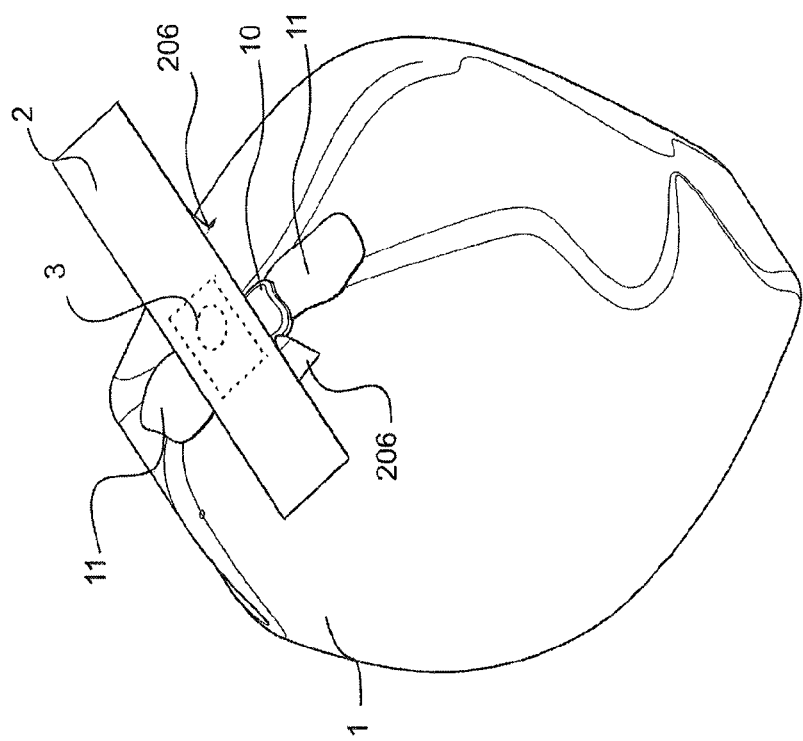
FIG. 3 presents a detail of a closing means according to the invention in connection with a waste bag, as viewed from a second direction.

FIG. 1 presents a waste bag 1, to which a closing means 2 according to the invention is fixed, which closing means is provided with an RFID identifier 3. The closing means 2 is arranged in the embodiment of the figure over the knot 10 formed in the waste bag 1, in which case it prevents opening of the knot 10 during transportation. The knot 10 is formed e.g. by knotting the carrying loops 11 of the bag 1. The closing means 2 comprises an adhesive surface on the side that is against the outer surface of the bag 1, in which case it sticks to the outer surface of the bag.

Figure 2:
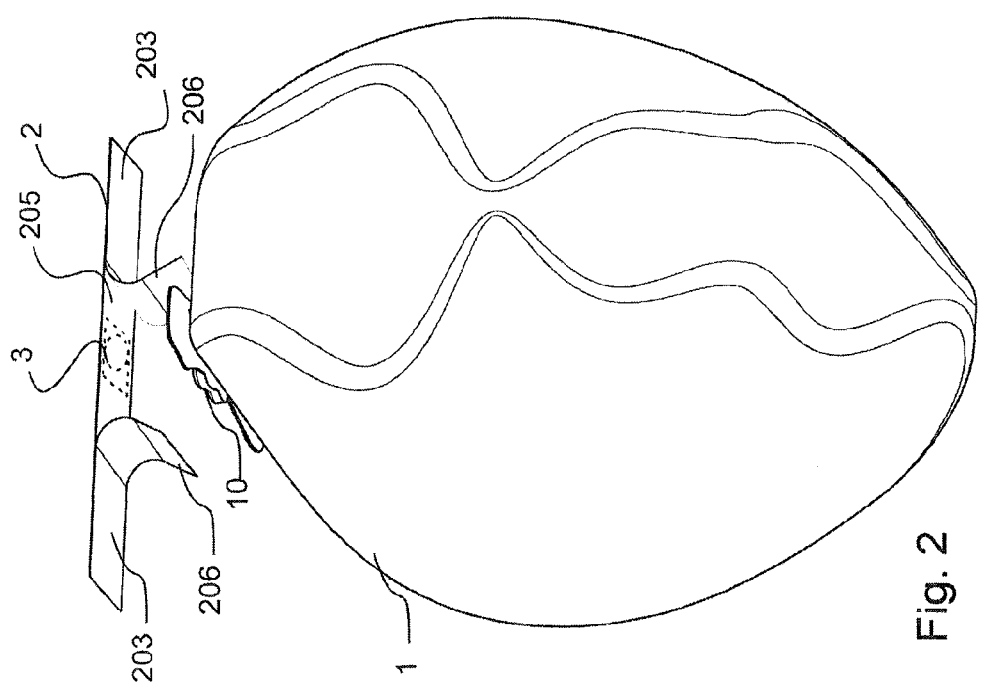
FIG. 2 presents a detail of a closing means according to the invention in connection with a waste bag, as viewed from a first direction.

The closing means in the case of FIG. 2 comprises a base part, onto which the RFID identifier 3 is arranged in a manner that is, in itself, known in the art. The base is preferably sticker laminate or corresponding, which can be fixed to the waste bag easily owing to the adhesive surface. FIG. 2 also presents a diagrammatic and simplified view of the parts of an RFID identifier. The RFID identifier comprises a memory part (chip) and an antenna part. The RFID identifier is preferably a passive RFID identifier, in which case it does not need its own power source.

FIGS. 2 and 3 present in simplified form a situation in which a closing means according to the invention is placed in connection with a waste bag 1. The closing means 2 comprises an adhesive surface 205 protected by at least one base part 203, which base part is removed before fixing the closing means to a bag. According to FIG. 2 there are two base parts 203, in which case they can be removed from the overlaps 206 of the base part by pulling. The overlaps 206 are formed onto the base part 203 to facilitate removal of the base part.

Figure 5:
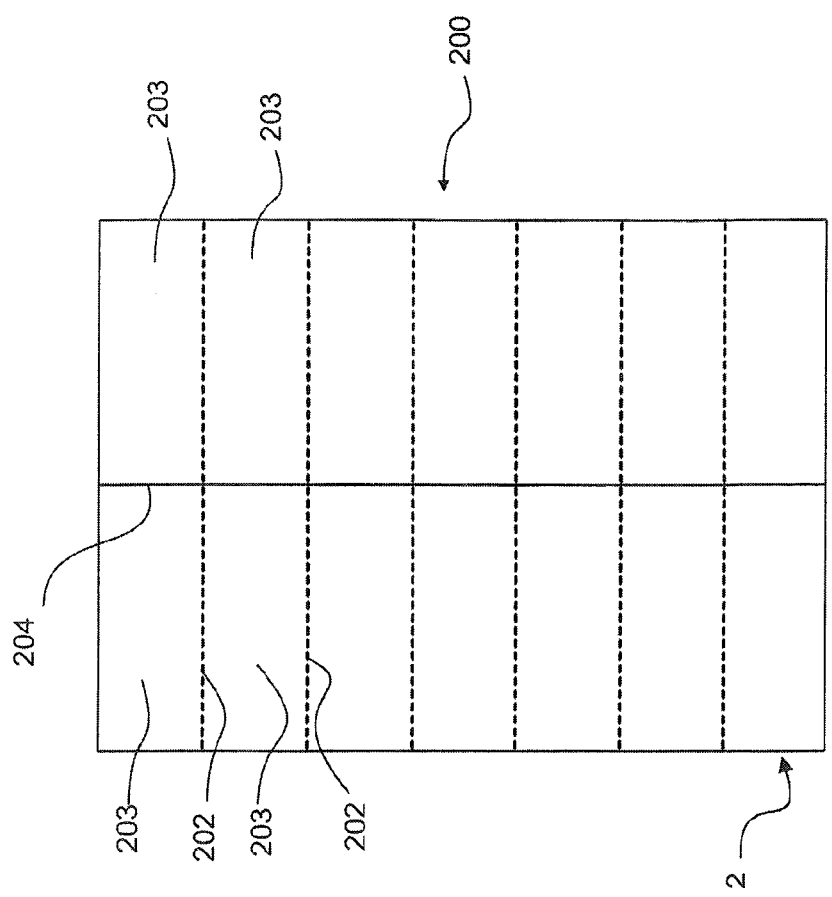
FIG. 5 presents a closing means sheet according to the invention, as viewed from a second direction.
Figure 4:
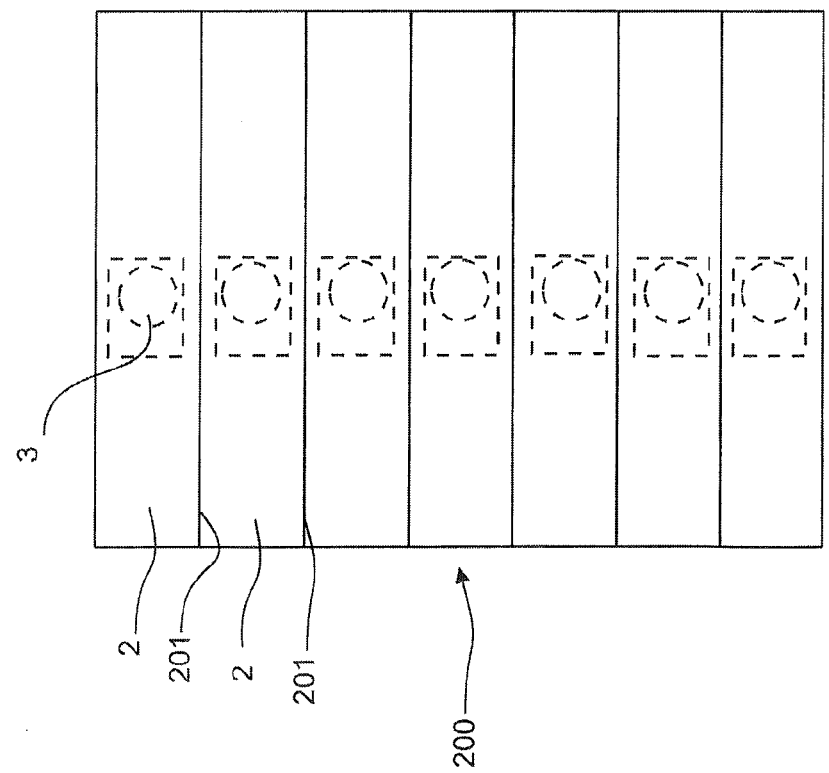
FIG. 4 presents a closing means sheet according to the invention, as viewed from a first direction.
Figure 7:
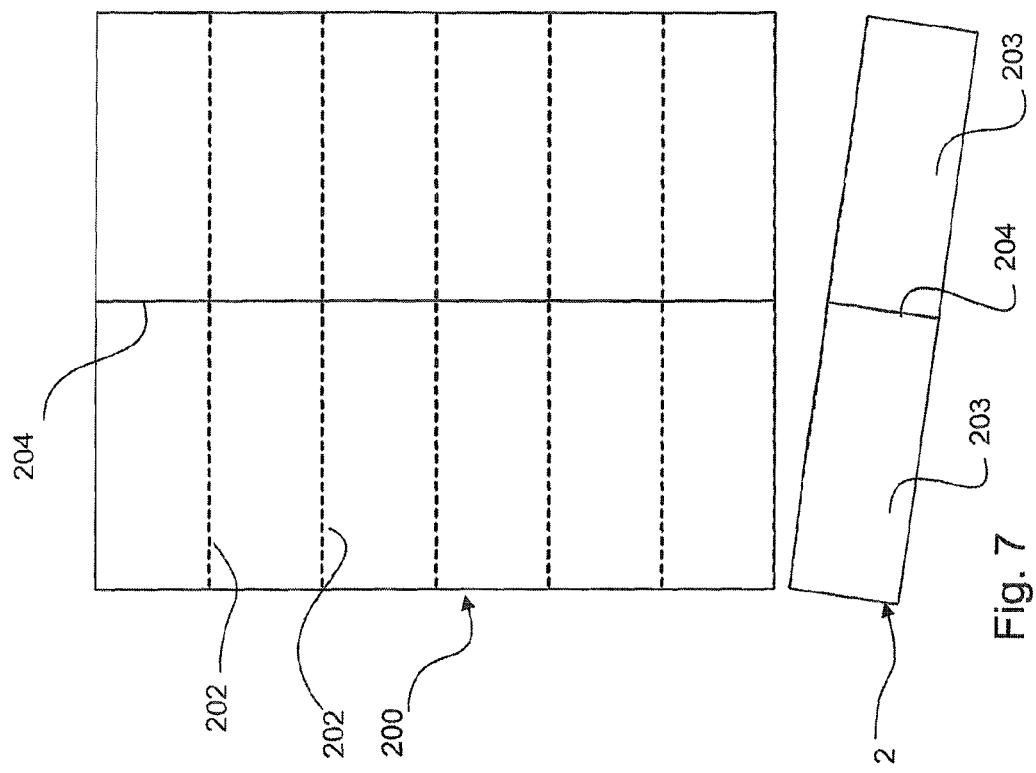
FIG. 7 presents a detail of the detachment of a closing means from a closing means sheet, as viewed from a second direction.
Figure 6:
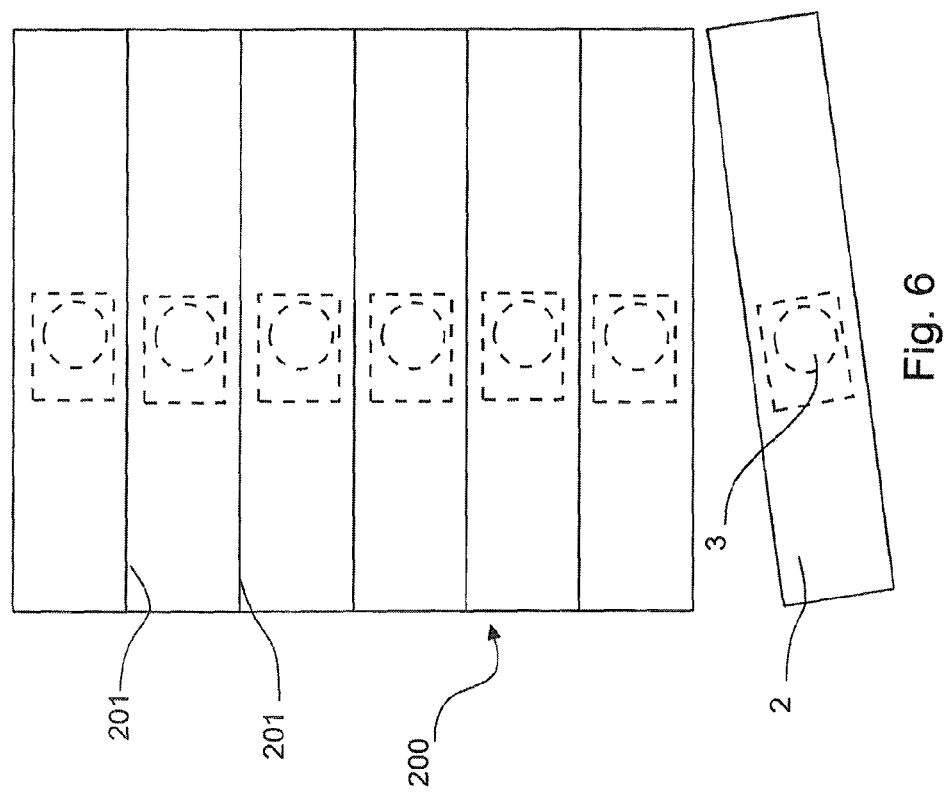
FIG. 6 presents a detail of the detachment of a closing means from a closing means sheet, as viewed from a first direction.

According to one embodiment (FIG. 7), a cut 204 is made in the base part, from where the base part divides into two parts, According to FIGS. 4 and 5, the closing means 2 are arranged into sheets 200, from which the closing means 2 are taken into use according to need, e.g. individually. According to FIG. 4, a cut 201 is formed between adjacent closing means, which cut separates the closing means from each other. The cut typically extends to the base part from the surface of the closing means, but not through the base part. FIG. 5 presents the closing means sheet of FIG. 4 from the side of the base part. According to one embodiment perforation 202 or corresponding is formed in the base part at the point of the cut that separates adjacent closing means. The closing means 2 is easy to detach from the closing means sheet 200 and base by tearing along the perforation 202. FIGS. 6 and 7 present one of the closing means detached from a sheet 200.

According to FIG. 5, a cut 204 that is transverse with respect to the closing means can be formed in the base part 203, which cut extends through the base part but not through the actual closing means.

Figure 8:
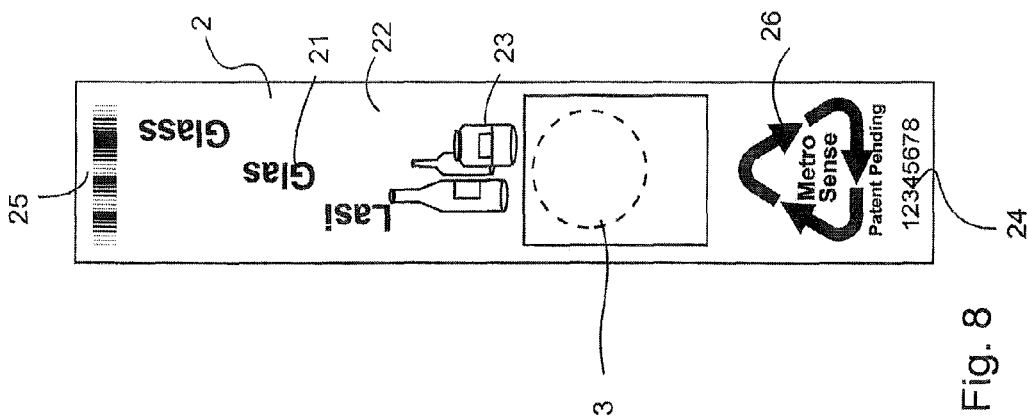
FIG. 8 presents one embodiment of a closing means according to the invention.

FIG. 8 presents one preferred embodiment of a closing means 2. In addition to an RFID identifier 3, the closing means 2 is also provided with other identifiers 21, 22, 23, 24, 25, 26. In the embodiment of the figure the closing means comprises a text marking 21, which expresses in words the type of waste for which the closing means in question is intended. The verbal marking 21 can be made in a number of different languages. A color code 22 is formed on the surface of the closing means 2, which color code can be a part of the area of the closing means or the size of the whole closing means. In addition, the closing means 2 can comprise a picture code or drawing code 23, which expresses the type of waste for which the closing means is intended. The closing means can comprise a customer code 24, which expresses the waste-producer community, such as a household, company or community. The customer code 24 is typically alphanumeric information. Furthermore, the closing means can comprise a barcode 25 or other visible graphical code. Furthermore, the closing means of waste groups intended for recycling can comprise a code descriptive of recycling. In addition, the closing means 2 can comprise the information or advertisements of a manufacturer or marketer. Furthermore, the closing means can comprise the name or other identifier of a local waste management company or community.

An RFID identifier can be arranged in a closing means in ways that are, in themselves, known in the art. The closing means can be fully according to the color fitted for each waste allotment or the color in question can be impressed or printed onto its surface. Correspondingly, other markings can be printed or otherwise formed on the closing means.

Figure 9:
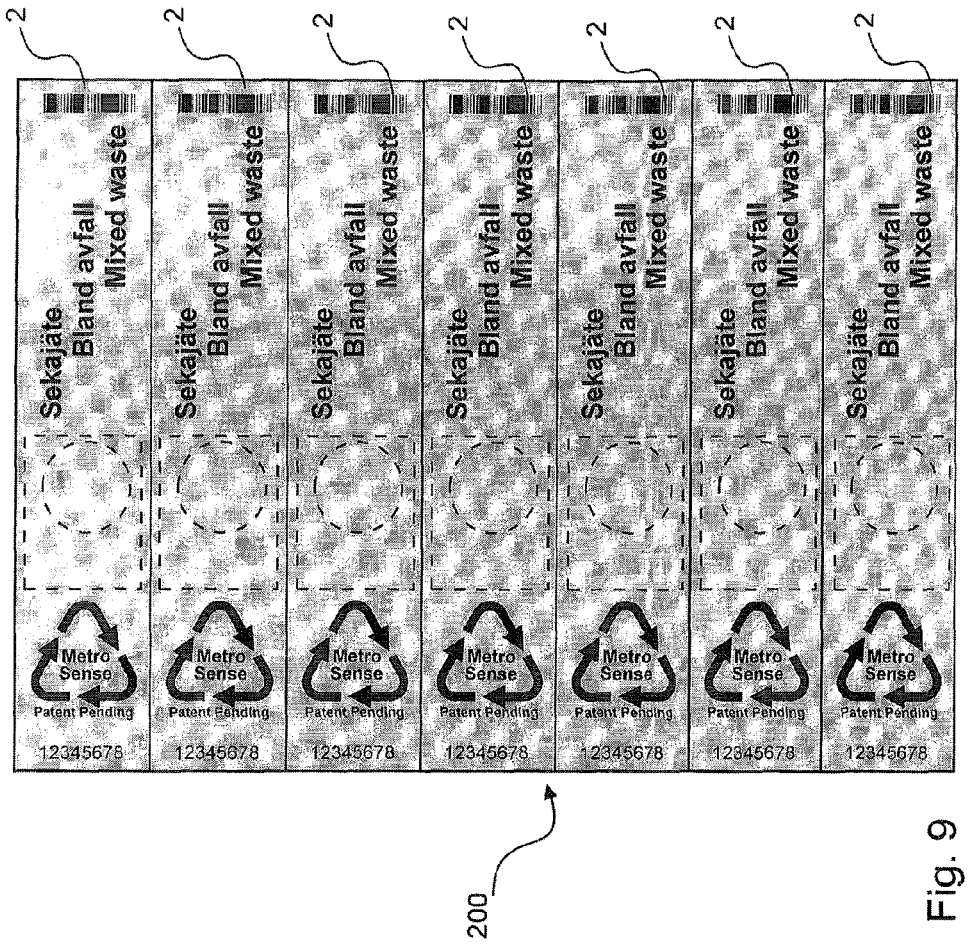
FIG. 9 presents one embodiment of a closing means sheet according to the invention.

FIG. 9 presents a closing means sheet 200 of one type of waste, which closing means sheet comprises a number of closing means 2.

Figure 10:
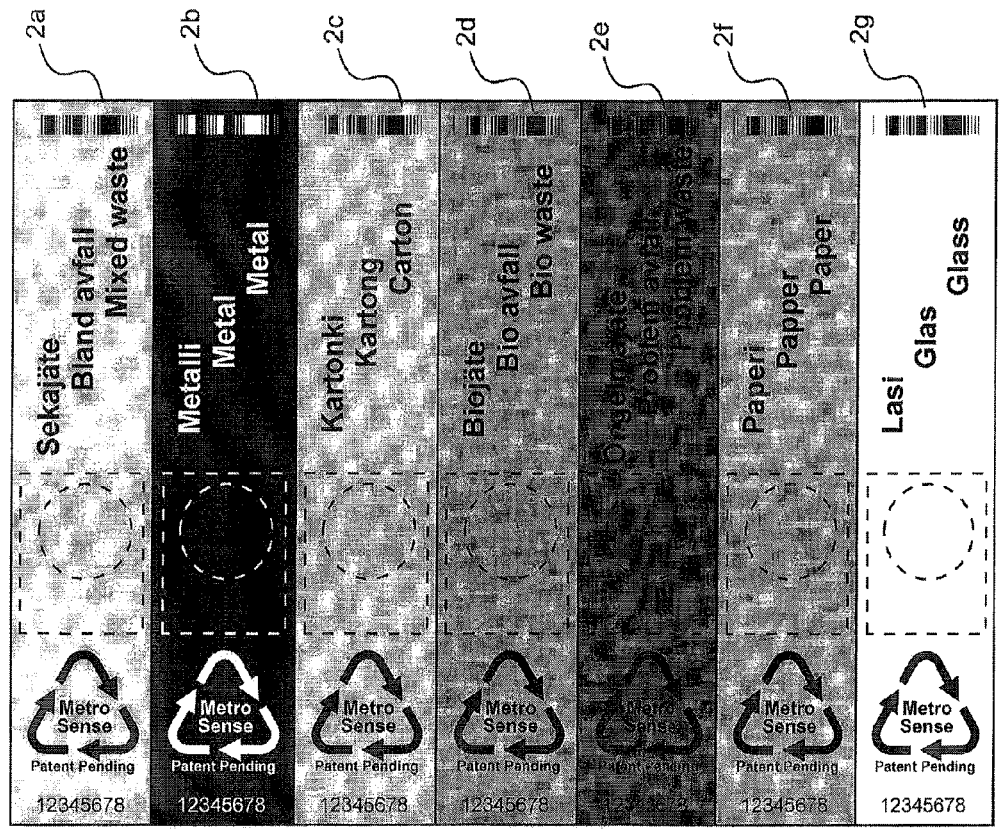
FIG. 10 presents some embodiments of some closing means according to the invention.

FIG. 10 presents some examples of different closing means 2a, 2b, 2c, 2d, 2e, 2f, 2g, which are intended for closing waste bags containing different types of waste. The embodiment in FIG. 10 presents a closing means 2a intended for mixed waste, a closing means 2b intended for metal, a closing means 2c intended for cardboard waste, a closing means 2d intended for biowaste, a closing means 2e intended for hazardous waste, a closing means 2f intended for paper, and a closing means 2g intended for glass. Also other waste materials can be marked with their own identifiers according to need.

Alternatively, the closing means 2 can be used as a conventional closer of the mouth part of a waste sack, by winding it tightly around the mouth part. If so desired, the mouth part can still be knotted or provided with an additional closer.

The combination according to the invention of a closing means 2 and an RFID identifier 3 can be utilized in connection with a waste transport system e.g. as follows. Closing means according to the invention, i.e. combinations of a closing means and an RFID identifier, are distributed or otherwise delivered to households or other waste producers. Typically closing means sheets 200 are distributed, which sheets comprise closing means 2 for a certain waste allotment. The RFID identifier comprises the code or corresponding identifier of each waste producer, with which code a producer of waste can if necessary be identified. According to one preferred embodiment the closing means 2 comprises an identification code, such as a color code, according to which the closing means is used in the system in the manner agreed in connection with each sorted waste bag. The color code can be the size of the whole closing means or a pattern or text. It is conceivable that a color code of a certain color is defined for mixed waste, a second color code for biowaste, correspondingly own color codes for recyclable materials. In this case users equip a waste bag comprising a certain type of waste with a closing means that comprises a corresponding color code.

In this way the waste bag wanted by the user can be used in connection with any different waste allotment whatsoever, and a waste producer marks a waste bag only with a color code of a closing means and RFID identifier according to the invention. Typically also an RFID identifier also already contains the waste type in connection with which it is used.

According to one preferred embodiment of the invention, a reader of an RFID identifier can be in connection with a lid or a hatch of a waste bin or of a waste disposal point, which allows feeding only the waste intended for the waste bin or waste disposal point in question into the bin in question. Particularly in connection with a pneumatic waste transport system, only one disposal point can in this case be conveniently used for different materials, in which case the system sorts waste into different allotments later according to an RFID identifier. At the same time, supplying waste material without an RFID identifier according to the invention into a disposal point of the system can also be prevented.

An RFID identifier can be used to register the amount of waste bought by a certain user, in which case invoicing principles can be changed. On the other hand, a user can be rewarded for sorting waste, e.g. by reducing the waste transport fee of waste that is fit for recycling.

According to a typical embodiment, the closing means is a closing sticker tape, which is an RFID sticker tape of the color of the waste allotment, which sticker tape comprises e.g. a text identifier according to the type of waste. In addition, an identification number or other identifier, which is separately specified according to each household, housing company, company other waste producer that produces waste, can be formed for a closing means and/or RFID identifier.

The invention can thus be utilized by using the ordinary plastic carrier bags of a shop, which are closed with a closing means 2 according to the invention. The carrier bag is filled with waste and closed by knotting its carrying loops. A typical way is to tie at first one knot, after which a closing means, preferably a sticker tape, is placed on top of the knot, and fixed over the knot of the carrier bag. After that a second knot is made with the carrying loops. The RFID identifier in this case remains partly protected and avoids transport damage. The closing means according to the invention also prevents the opening of the knots of the waste bag.

Figure 11:
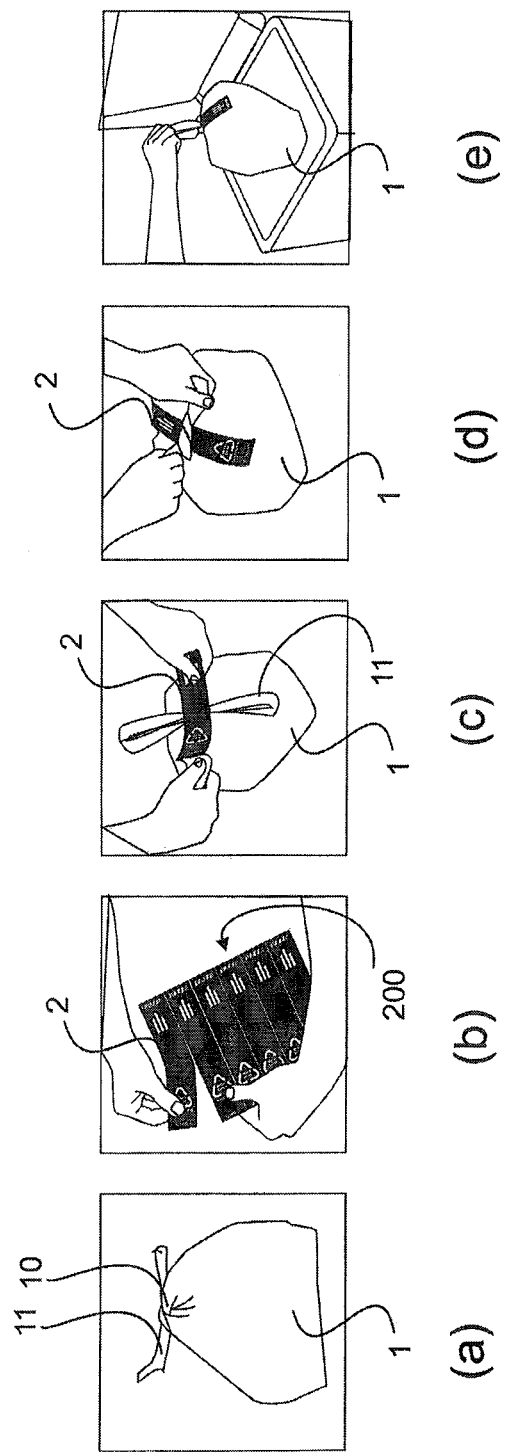
FIG. 11 presents a picture series about the use of a closing means according to the invention.

FIG. 11 further presents, for the sake of clarity, the use of a closing means in connection with a waste bag as a series of drawings. FIG. 11(a) contains an ordinary waste bag 1, comprising a knot 10 made with the carrying loops 11. In FIG. 11(b) one closing means 2 is detached from the closing means sheet 200. In FIG. 11(c) a closing means is placed onto a waste bag, preferably on top of the knot 10. Yet another knot can be made, if so desired, with the carrying loops on top of the closing means 2 as happens in FIG. 11(d). After this the waste bag 1 is ready to be placed into a disposal point, such as into a waste bin, as happens in FIG. 11(e).

In the waste sorting center to which the waste bags are transported conventionally with garbage trucks or in some other way, such as with a pneumatic waste transfer system, the waste bags are sorted into different waste allotments on the basis of the information given by the RFID identifiers. After this the waste bags are ripped open and the bags are removed from the rest of the waste. The RFID identifier of the closing means according to the invention can still be used as a verification by the aid of a reader means that the waste bags have been removed from the sorted waste allotments.

A dedicated closing means comprising an RFID identifier is arranged for each waste allotment. Recyclable paper, for instance, is handled in a corresponding manner. In this case paper, such as newspapers, is placed in a bag and it is closed with a closing means according to the invention, which closing means comprises an RFID identifier.

The closing means according to the invention can be supplied as a web comprising a number of closing means, e.g. arranged into a roll. This type of closing means roll preferably comprises a cutting point between each two consecutive closing means. Cutting the closing means can be facilitated by arranging perforation or corresponding in the roll to facilitate detaching a closing means from the roll.

The operation of a pneumatic waste transport system can be optimized more accurately than earlier. For example, the speed and quantity of the wastes transferred in the tubing can be measured more easily by means of the RFID identifiers of the closing means of the waste bags and by means of the RFID readers arranged in the tubing or in the transfer system. Likewise the transfer time from the waste disposal point to the waste station can be determined, in which case emptying of the next disposal point can be optimized. For example, waste code X leaves from a disposal point A, which waste code is at point Y in the tubing, in which case the next waste disposal point B can be activated.

Waste disposal points can be constructed so that they do not accept waste if the waste bag is not provided with a closing means comprising an RFID identifier.

An RFID identifier can also report the filling degree of a waste bin or of a waste disposal point. In this case the transportation of waste can be optimized. Transport is performed only if the filling degree is exceeded. This saves energy and reduces emissions. An RFID identifier can also report the contents of waste. If the waste contains something decomposable, a collection can be requested for the location. An RFID identifier can also give a temperature alarm, i.e. a fire alarm. An RFID identifier can also report when waste has been put into a waste bin and into which waste bin, in which case in which case information about waste quantities, types and trends is obtained.

Using a closing means according to the invention in pneumatic pipe transport has the advantage that a dedicated disposal point for different allotments is not needed, but instead all waste goes to the same disposal point. In normal waste transport waste containers of only a single type are needed, and only one garbage truck collects them instead of 3-4 trucks. It is also advantageous if all wastes, such as mixed waste, biowaste, glass waste, metal waste and paper waste, are placed into a bag. In this case the allotments stay clean and their tube transportation is easier. The bag is automatically removed in a sorting center.

The invention can be applied according to one preferred embodiment so that dedicated closing means, which comprise RFID identifiers, are supplied to each household. This assists sorting. In addition, by means of the combination of a closing means and RFID identifier according to the invention, it is easy to demonstrate where the costs of the waste handling system are generated. Fees can be allocated to waste producers more accurately than earlier.

According to one preferred embodiment, households have a fixed waste charge and receive a credit for each waste bag sorted in a sorting center. Based on the automatic reading of RFID identifiers, the system can allocate the sorted waste by means of an information system so that the credit goes to the correct target.

Although a combination of a closing means and an RFID identifier is the most preferred embodiment, the system does not exclude an alternative wherein waste bags comprising a ready RFID identifier are, if desired, used instead of a closing means. This however requires separate waste bags provided with an RFID identifier, for each waste allotment.

Sorting on the basis of an RFID identifier in a sorting center is very easy, as also is identification of a household. An RFID identifier gives numerous opportunities in waste sorting.

The invention thus relates to a method in a waste handling system, in which method waste or recyclable material is transported in carrier bags, bags or sacks 1. A closing means 2, which is provided with an RFID identifier 3, is used in closing, or as verification of the closing of, the carrier bag, bag, sack or corresponding used in the waste transport.

According to one preferred embodiment, in the method a carrier bag, bag or sack 1, such as a plastic carrier bag, plastic sack or plastic bag, that is preferably freely chosen by the user is used in waste transport.

According to one preferred embodiment the closing means 2 comprises at least one first visible identifier 21, 22, 23, such as a pattern, color, code, marking or corresponding, which defines the type of waste material or recyclable material contained in a bag, carrier bag, sack or corresponding that the closing means 2 is used to close.

According to one preferred embodiment the closing means 2 comprises at least one second visible identifier 24, 25, such as a marking, code or corresponding, which expresses the user community, such as a household.

According to one preferred embodiment the closing means 2 comprises an adhesive surface 205, with which the closing means can be fixed to the carrier bag, bag or sack 1.

Typically a tape, which has an adhesive surface 205 on one side, is used as a closing means 2.

According to one preferred embodiment the closing means 2 comprises a base part 203, which protects the adhesive surface 204, and is removed before fixing the closing means to the carrier bag, bag or sack.

According to one preferred embodiment a reading unit of an RFID identifier is arranged in connection with, or in the proximity of, a disposal point of the waste system, which reading unit is fitted to control the waste transport system, or a part of it, on the basis of the information given by the RFID identifier.

According to one preferred embodiment in the method wastes are sorted into different allotments on the basis of information given by RFID identifiers 3.

According to one preferred embodiment an RFID identifier 3 of a closing means 2 is used to optimize the operation of a transport system.

According to one preferred embodiment in the method the closing means are arranged into a closing means sheet 200 or closing means web, e.g. into a roll, comprising a number of closing means 2, from which sheet or web closing means are taken individually according to need.

According to one preferred embodiment a cut 201 is formed in a closing means sheet 200 between adjacent closing means 2, which cut extends most preferably from the surface to the surface of the base part 203.

According to one preferred embodiment perforation 202 or corresponding is formed in the base part 203 in a closing means sheet 200 between essentially adjacent closing means 2, along which perforation the closing means 2 with base part can be detached from the sheet 200.

According to one preferred embodiment a cut 204 or corresponding is formed in the base part 203 to facilitate removal of the base part 203 from the front of the adhesive surface when fixing the closing means.

The invention also relates to a closing means for closing, or for verifying the closing of, a bag, carrier bag, sack or corresponding used in the transport of wastes. The closing means 2 according to the invention comprises an RFID identifier 3.

According to one preferred embodiment the closing means 2 comprises at least one first visible identifier 21, 22, 23, such as a pattern, color, code, marking or corresponding, which defines the type of waste material or recyclable material contained in a bag, carrier bag, sack or corresponding that the closing means 2 is fitted to be used for closing.

According to one preferred embodiment the closing means 2 comprises at least one second visible identifier 24, 25, such as a marking, code or corresponding, which expresses the user community, such as a household.

According to one preferred embodiment the closing means 2 comprises an adhesive surface 205, with which the closing means can be fixed to a countersurface, more particularly to a carrier bag, bag or sack or corresponding.

According to one preferred embodiment the closing means 2 comprises a tape, which has an adhesive surface on one side.

According to one preferred embodiment the closing means 2 are arranged into a sheet 200 or web, e.g. into a roll, comprising a number of closing means, from which sheet or web closing means 2 are taken according to need, e.g. individually.

According to one preferred embodiment the closing means 2 comprises a base part 203, which protects the adhesive surface 204, which base part is fitted to be removed before fixing the closing means.

According to one preferred embodiment a cut 201 is formed in a closing means sheet 200 between adjacent closing means 2, which cut extends from the surface to the surface of the base part 203.

According to one preferred embodiment perforation 202 or corresponding is formed in the base part 203 in a closing means sheet 200 between essentially adjacent closing means 2, along which perforation the closing means 2 with base part 203 can be detached from the sheet 200.

According to one preferred embodiment a cut 204 or corresponding is formed in the base part 203 to facilitate removal of the base part 203 from the front of the adhesive surface when fixing the closing means.

According to yet another embodiment, a closing means comprises the name or other identifier of a local waste management company or community, such as a municipality.

According to yet another embodiment a binding means, such as a cable tie, in which an RFID identifier is arranged, is used as a closing means. The binding means comprises a tongue part, which in itself is known in the art, which tongue part is threaded in the usage position through the loop part. The inner surface of the tongue part typically comprises toothing and the loop part comprises a retaining means that fits the toothing of the tongue part so that in the usage position the tongue part is not able to slide out of the loop, but instead typically only in the opposite tightening direction.

The use of an RFID identifier in connection with a pneumatic waste transport system is described in publication WO 2005/118435. The use of an RFID identifier in the sorting of waste is presented in publication WO 2006/096101.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method for transporting, identifying and tracking waste or recyclable material which comprises:
    placing the waste or recyclable material into a receptacle provided with carrying loops,
    forming the carrying loops into a knot to close the receptacle,
    applying a closing means having an adhesive surface, on the knot for sealing the receptacle and securing the knot so that the knot does not open and the receptacle is maintained closed during transport,
    wherein the closing means is provided with at least one, visible RFID identifier for tracking purposes and for identifying waste products, content of waste, and the amount of waste, said closing means further containing information selected from waste identification, visible markings in multiple languages, color code, picture code, consumer code, recycling code and advertisements.

2. The method of claim 1, wherein the receptacle is made of a plastic material.

3. The method of claim 1, wherein a second visible identifier is applied as a closing means to identify the user community or household.

4. The method of claim 1, wherein the adhesive surface is provided on the opposite side of the closing means from the visible identifier.

5. The method of claim 1, wherein the adhesive surface is covered with a protective base member which is removed prior to fixing the closing means to the receptacle.

6. The method of claim 1, wherein a reading unit of the RFID identifier is coordinated with a disposal point for the waste or recyclable material and a waste transport system.

7. The method of claim 1, wherein the waste or recyclable material is sorted into different categories and allotments based upon information given by the RFID identifier.

8. The method of claim 1, wherein the closing means is produced in quantity as a sheet or roll, with adjacent closing means being connected together with perforations which provide for ready detachment.

9. The method of claim 1, wherein the RFID identifier is provided with a fire alarm and the filling degree at the waste disposal plant.

10. A receptacle used for transporting, identifying and tracking waste or recyclable material, said receptacle comprising:
    carrying loops formed into a knot to close the receptacle, and
    a closing means having an adhesive surface placed on the knot for sealing the receptacle and securing the knot so that the knot does not open and the receptacle is maintained closed during transport, wherein the closing means is provided with at least one, visible RFID identifier for tracking purposes and for identifying waste products, content of waste, and amount of waste, said closing means further containing information selected from waste identification, visible markings in multiple languages, color code, picture code, customer code, recycling code and advertisements.

11. The receptacle of claim 10, wherein an additional knot is formed in the carrying loops, said additional knot being formed on top of the closing means to protect the RFID identifier.

12. The receptacle of claim 10, wherein the closing means are provided in sheets
and are pre-cut for closing and securing the closing of the receptacle.

13. The receptacle of claim 10, wherein the closing means is paper based and provide with instructions on how to use the closing means.

14. The receptacle of claim 10, wherein the RFID identifier of the closing means is pre-programmed according to the customer and according to waste type or recyclable material type.

15. The method of claim 1, wherein the closing means is fixed on top of the knot and another knot is formed on top of the closing means with the carrying loops.

16. The receptacle of claim 10,
wherein the RFID identifier is provided with a fire alarm and the filling degree at the waste disposal plant.

* * * * *